United States Patent
O'Halloran et al.

(10) Patent No.: US 9,297,478 B2
(45) Date of Patent: Mar. 29, 2016

(54) REACTOR VESSEL VALVE SYSTEM

(75) Inventors: John O'Halloran, Glanmire (IE); Fergus Keane, Ballincollig (IE); Brian Guilly, Clashmore (IE)

(73) Assignee: SCHUP VALVE TECHNOLOGY GMBH, Cork (IE)

( * ) Notice: Subject to any disclaimer, the term of this patent is extended or adjusted under 35 U.S.C. 154(b) by 357 days.

(21) Appl. No.: 13/817,904

(22) PCT Filed: Aug. 19, 2011

(86) PCT No.: PCT/IE2011/000046
§ 371 (c)(1),
(2), (4) Date: Feb. 20, 2013

(87) PCT Pub. No.: WO2012/023125
PCT Pub. Date: Feb. 23, 2012

(65) Prior Publication Data
US 2013/0149202 A1 Jun. 13, 2013

(30) Foreign Application Priority Data
Aug. 20, 2010 (IE) .................................... 2010/0519

(51) Int. Cl.
*B01J 19/00* (2006.01)
*F16K 27/07* (2006.01)
(Continued)

(52) U.S. Cl.
CPC ................. *F16K 37/00* (2013.01); *F16K 27/07* (2013.01)

(58) Field of Classification Search
CPC ........... F16K 5/00; F16K 5/02; F16K 5/0242; F16K 5/04; F16K 5/0442; F16K 5/06; F16K 5/0647; F16K 27/07; F16K 31/00; F16K 37/00; B01J 19/00; B01J 2219/00274; B01J 2219/00277; B01J 2219/00279; B01J 2219/00331; B01J 2219/00333; B01J 2219/00337

See application file for complete search history.

(56) References Cited

U.S. PATENT DOCUMENTS

| | | |
|---|---|---|
| 4,578,170 A | 3/1986 | Sheridan |
| 4,595,487 A | 6/1986 | Nunlist |
| 4,803,365 A | 2/1989 | Krause |
| 4,968,152 A | 11/1990 | Bergmann |

(Continued)

FOREIGN PATENT DOCUMENTS

DE 102007038467 2/2009

OTHER PUBLICATIONS

Machine translation of DE 102007038467 A1, which was published Feb. 19, 2009.*

*Primary Examiner* — Natasha Young
(74) *Attorney, Agent, or Firm* — Jacobson Holman, PLLC.

(57) ABSTRACT

A valve system for a vessel has a valve body, and a valve stem extending through the valve body and terminating in a plug for axial movement between open and closed position as the stem moves through the valve body. There is at least one probe passageway through the valve stem, at least one of which has a circumferential seal for engaging a probe inserted in the passageway and being exposed in a vessel. The circumferential seal seals the inside of a vessel from atmosphere while allowing a probe to be inserted and removed by moving axially in the passageway. This avoids need to remove the valve system to insert or remove a probe, and indeed a single expensive probe is used at different times with different valve systems. When no exposed probe is required, the seal may be completed by simply inserting a dummy probe in the passageway.

19 Claims, 8 Drawing Sheets

(51) Int. Cl.
*F16K 37/00* (2006.01)
*F16K 5/00* (2006.01)
*F16K 5/02* (2006.01)
*F16K 5/04* (2006.01)
*F16K 5/06* (2006.01)
*F16K 31/00* (2006.01)

(56) References Cited

U.S. PATENT DOCUMENTS

| | | |
|---|---|---|
| 6,772,652 B2 * | 8/2004 | Cronimus .................... 73/866.5 |
| 7,001,069 B2 * | 2/2006 | Phipps .......................... 374/208 |
| 2002/0104568 A1 | 8/2002 | Cronimus |

* cited by examiner

REACTOR VESSEL VALVE SYSTEM

This is a national stage of PCT/IE11/000046, now WO 2012/023125, filed Aug. 19, 2011 and published in English, which has a priority of Ireland no. 2010/0519 filed Aug. 20, 2010, hereby incorporated by reference.

INTRODUCTION

The invention relates to vessels for industries such as the food processing, chemical, pharmaceutical, and petrochemical industries.

Flush bottom outlet valves for draining are mounted to the bottom of vessels such as reactor vessels, typically found in chemical, pharmaceutical and petrochemical plants.

There is an increasing demand from end-users to monitor and analyse the internal reactions within vessels, using in-situ probes. This is often referred to as "Process Analytical Technology" ("PAT"), and involves real time reaction monitoring. Probe technology has improved and in some instances a single probe can sense more than one parameter.

In the field of probe systems U.S. Pat. No. 4,578,170 and U.S. Pat. No. 4,595,487 are examples of probe holders. In these systems it is necessary to remove the full holder when replacing a probe. U.S. Pat. No. 4,803,365 describes an optical probe system in which a probe is inserted into a cylinder with a window in the end face for optical inspection. U.S. Pat. No. 4,888,154 describes a probe system in which elongate tubes extend into a vessel and probes are exposed at the ends of these tubes.

With existing vessels, adding extra holders for additional probes is not desirable because of the cost and re-certification requirements for drilling additional holes in the vessel and installing the holders.

The invention is directed towards providing an improved valve system.

SUMMARY OF THE INVENTION

According to the invention, there is provided a valve system for a vessel, the valve system comprising:
  a valve body,
  a valve stem extending through the valve body and terminating in a plug for axial movement between open and closed position as the stem moves through the valve body,
  at least one probe passageway through the valve stem, and
  at least one of said passageways having a circumferential seal for engaging a probe inserted in the passageway and being exposed in a vessel, the circumferential seal being adapted to seal around the probe in the passageway while allowing the probe to be inserted and removed by moving axially in the passageway.

In one embodiment, said circumferential seal is within the plug.

In one embodiment, the valve stem terminates in a collar engaged with the plug, and said seal is over said collar.

In one embodiment, the seal comprises at least one O-ring surrounding said passageway.

In one embodiment, there are at least two O-rings spaced apart by a sleeve.

In one embodiment, the plug comprises an O-ring seal for engagement with a vessel aperture rim.

In one embodiment, the stem comprises at least two passageways, to accommodate at least two probes.

In one embodiment, at least one passageway is blind, whereby a probe is not exposed. Preferably, said passageway terminates in a tower in the valve plug.

In one embodiment, separation distance of the passageways is in the range of 1.5 mm to 30 mm.

In one embodiment, the system comprises a releasable coupler at a base of the system for removal and re-introduction of probes.

In one embodiment, the coupler comprises a release fastener for connecting a sleeve for a removable probe from a base of an actuator of the system.

In one embodiment, the system further comprises an actuator and a stem extending through the actuator and having at least one probe passageway.

In one embodiment, the actuator stem is connected to the valve stem with the passageway aligned.

In one embodiment, interconnecting ends of the valve and actuator spindles have inter-engagement features arranged so that when the stems are fitted together the passageways are aligned correctly, said slots acting to prevent the spindles from rotating independently of each other.

In one embodiment, the actuator stem is arranged to travel in a linear movement in the actuator, and an actuator upper housing part, an actuator lower part, an actuator diaphragm, and an actuator spring plate all have passageways through which the actuator stem fits.

In one embodiment, the system further comprises a probe adapted for insertion in said passageway and having a tip suitable for exposure inside a reaction vessel. In one embodiment, the probe is an infra red probe.

In one embodiment, the system further comprises a dummy probe adapted to fit in said passageway and seal against the circumferential seal when a probe is not required.

In a further aspect, the invention provides a reaction vessel comprising a vessel body and a valve system as defined above in any embodiment. In one embodiment, said valve system is in a base of the vessel body.

DETAILED DESCRIPTION OF THE INVENTION

The invention will be more clearly understood from the following description of some embodiments thereof, given by way of example only with reference to the accompanying drawings in which.

Figure 1:
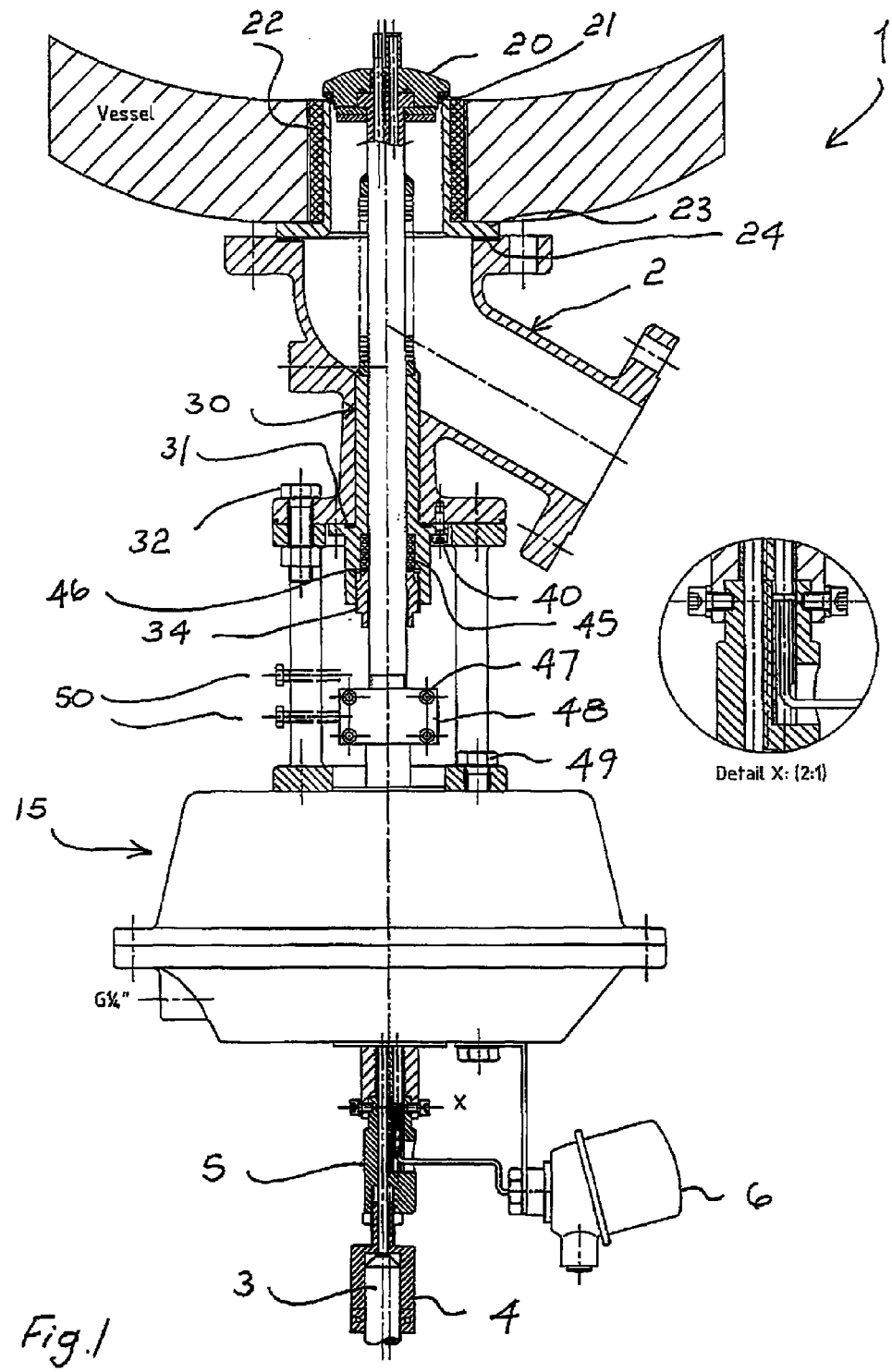
FIG. 1 is a part cross-sectional diagram illustrating a valve system of the invention.
Figure 2:
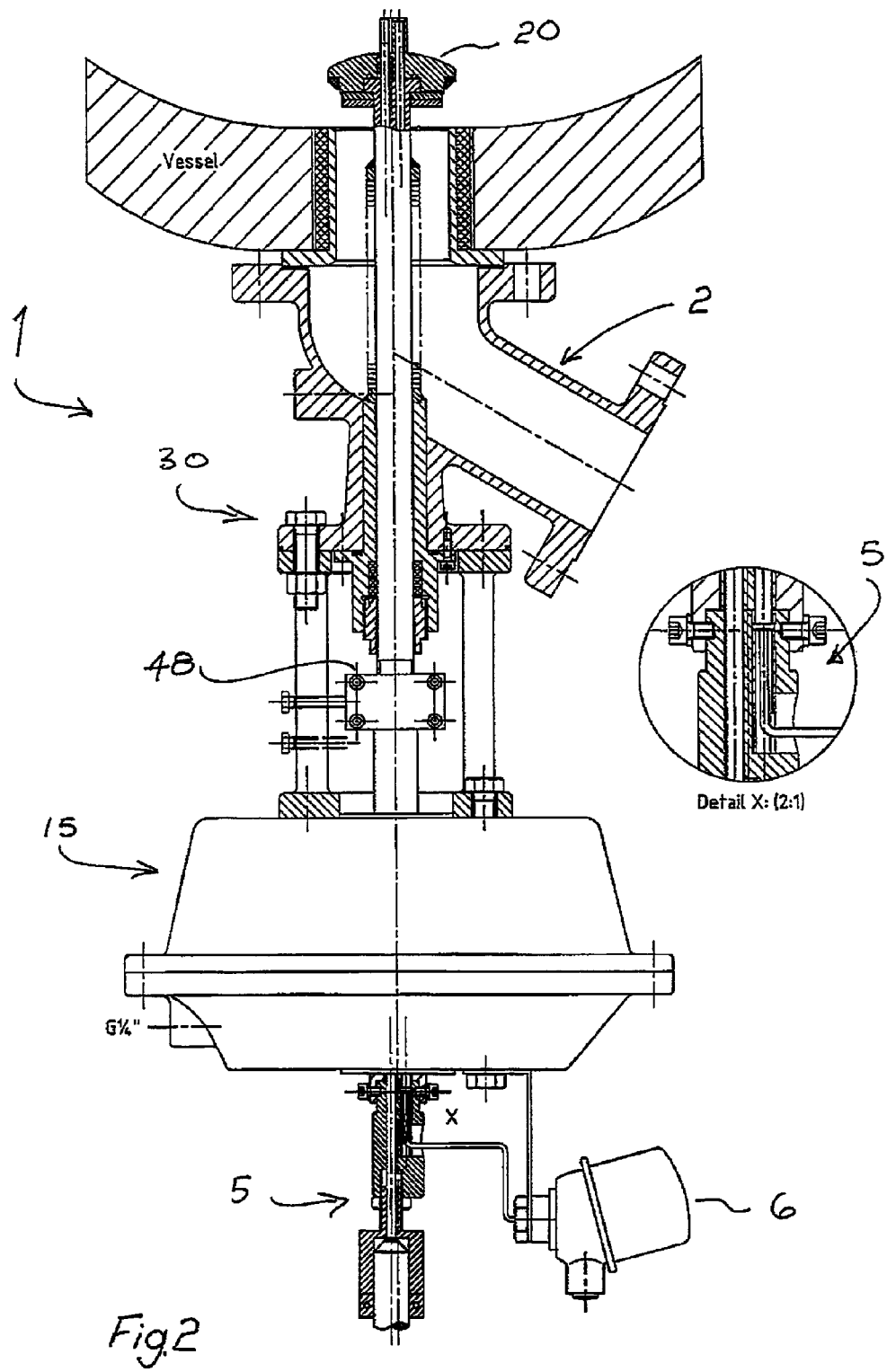
FIG. 2 is a similar view with the valve open.
Figure 3:
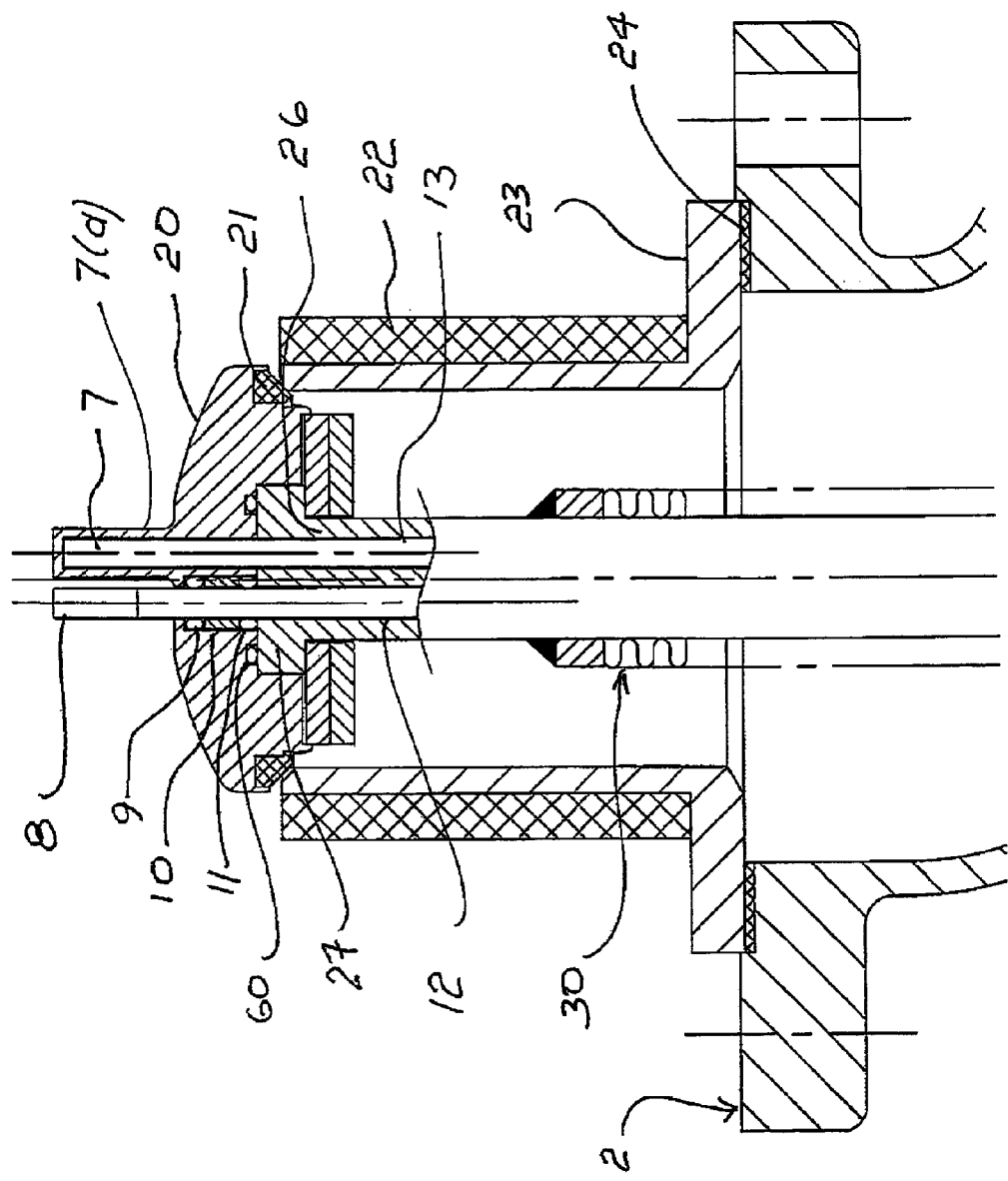
FIG. 3 is an elevational cross-sectional view showing the probe tip and valve disc in more detail.
Figure 4:
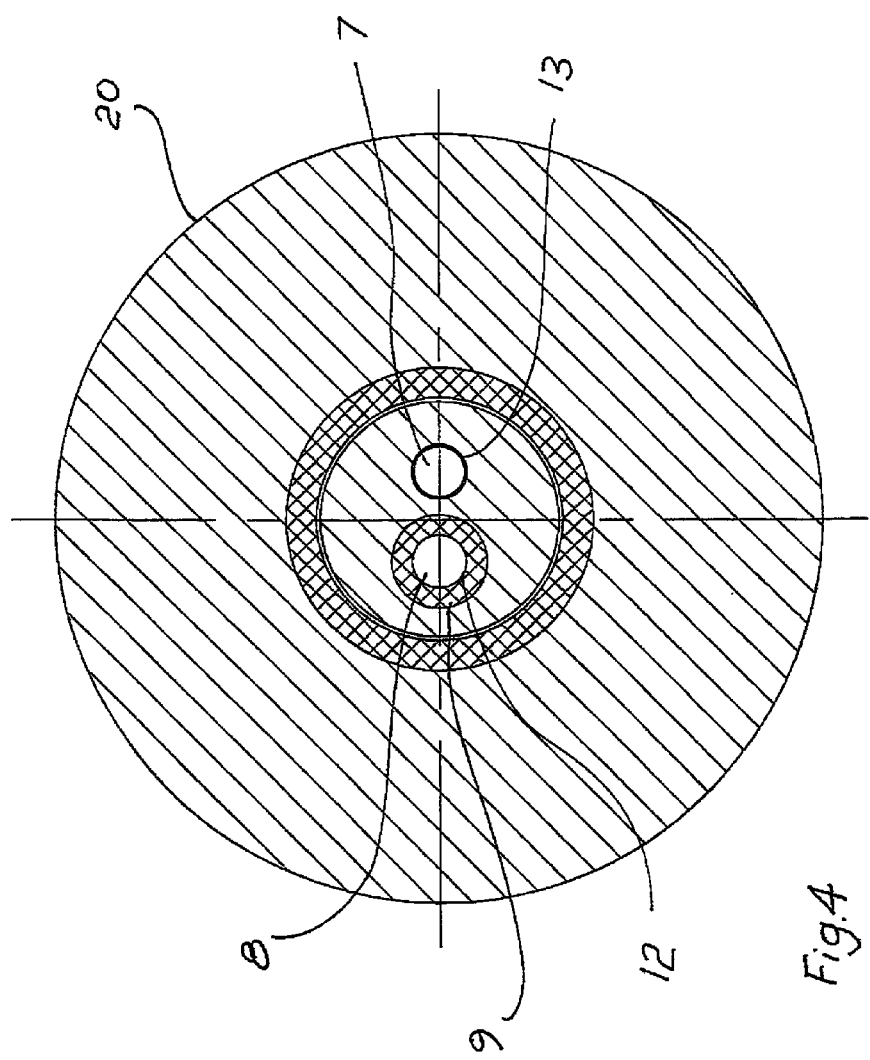
FIG. 4 is a cross-sectional horizontal view through the probe tip.

Referring to FIGS. 1 to 7 a valve system 1 is for attachment to the bottom of a reaction vessel. It provides all of the functionality of a typical valve system, but additionally it allows two probes to be inserted to monitor vessel reactions. Moreover, the probes can be individually installed and removed without need to remove any of the valve system fixtures from the vessel, and one or more of the probes can be exposed within the vessel. The system 1 comprises the following main components:
  2, valve body;
  3, infra-red probe;

4, housing for base of the infra-red probe 3;

5, a probe connecting piece which is flanged to support continuation of the probes upwardly through a passageway to the top of the valve system 1;

6, a temperature sensor connection head;

7, temperature sensor tip, such as a PT100 RTD temperature sensor;

8, tip of the infra-red probe 3, which is exposed in the vessel;

9, 10, 11, O-rings and sleeve forming a circumferential seal around the probe tip 8;

12, passageway for the probe 8, 13, passageway for the probe 7, 15, pneumatic diaphragm actuator for the valve;

20, valve disc (or "plug");

21, valve sealing ring;

22, PTFE sleeve extending through to the vessel wall;

23, valve seat;

24, valve gasket;

26, valve spindle (or "stem"), 27, valve stem collar, 30, bellows assembly;

31, O-ring, 32, bolt and nuts connecting a top assembly with the valve body to the actuator, 34, emergency stuffing box nut;

40, cap screw, 45, 46 packing rings, and washer;

47, cap screw for connecting piece 48, 48, 49, connecting piece and bolts for actuator 15, 50, anti-rotation bolts, 60, valve disc O-ring, 70, release screws for probes, and connecting piece 5, 71, temperature sensor conduit, for PT100 RTD temperature sensor 7, terminated in connection head 6, 72, support bracket for temperature sensor connection head.

Figure 5:
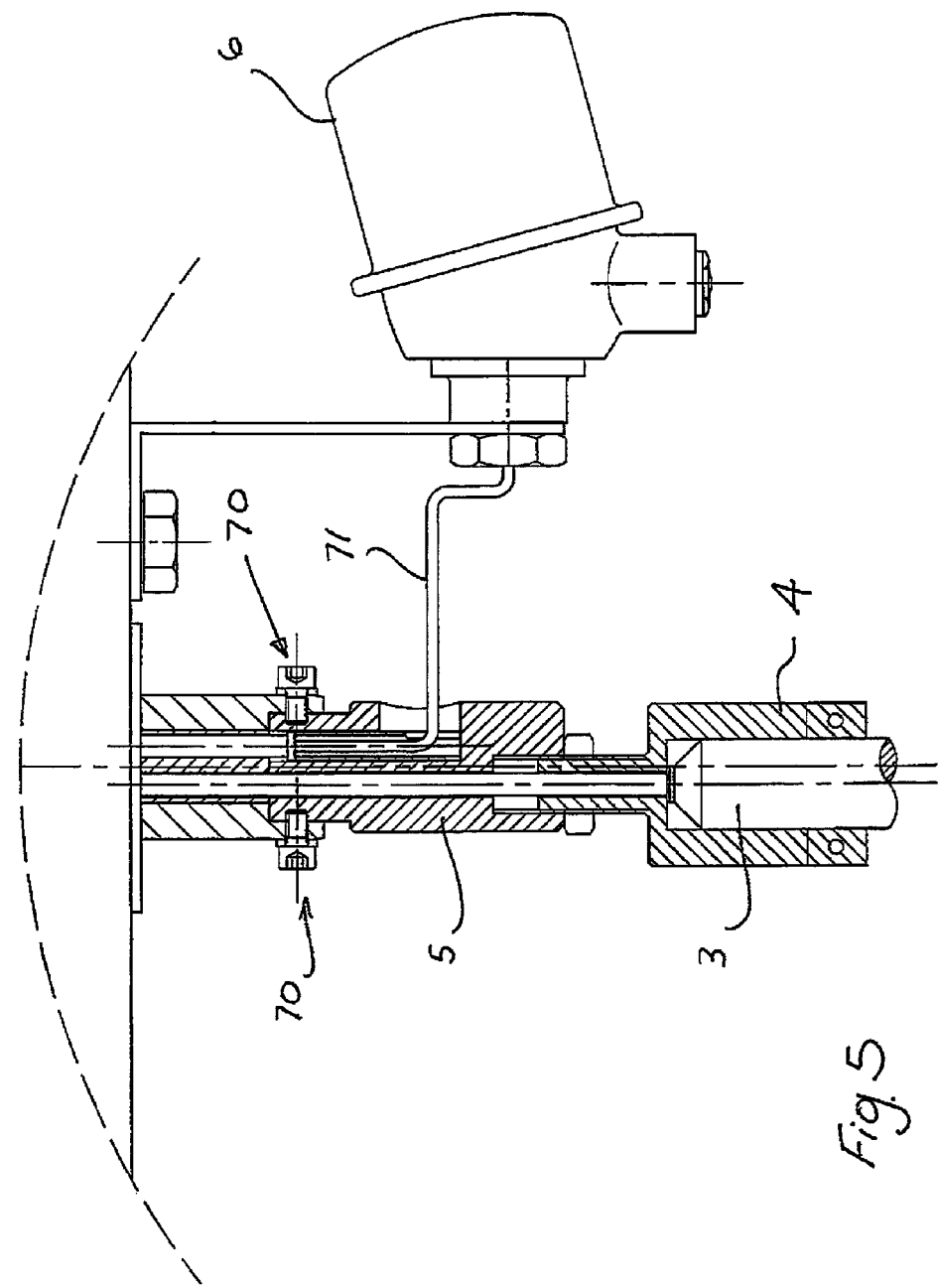
FIG. 5 is an enlarged scale view showing the bottom of the system, showing the probe arrangement.
Figure 6:
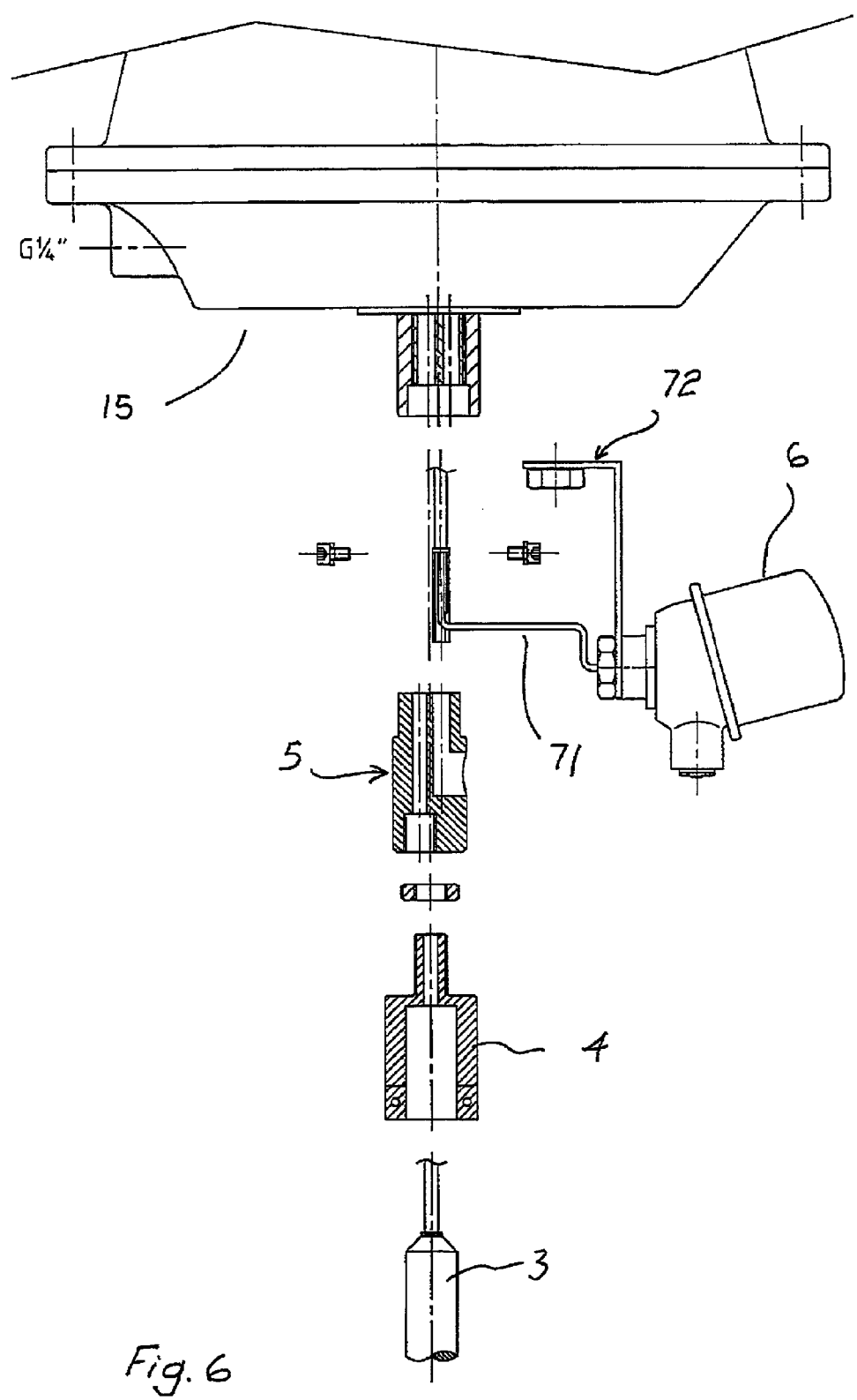
FIG. 6 is an exploded view.

The valve system 1 performs the conventional valve operations required for the bottom of a reaction vessel, the configuration of the valve disc (or "plug") 20 being sloped to avoid blind spots for vessel draining and flushing. However, the central stem 26 of the system 1 includes both the temperature sensor probe 7 and the infra red probe 8. They are fitted as illustrated into a confined space so that the system 1 can include the pneumatic actuator 15, of similar overall configuration to one which accommodates a single sensor extending through it. Importantly, the probe 8 and the temperature sensor 7 can be easily removed by disassembling as shown in FIGS. 5 and 6. It is only necessary to simply pull the probes out while leaving the valve system in place. The temperature sensor 7 is enclosed. However, the IR probe 8 is exposed in the vessel. However it can be removed by simply pulling it down. The circumferential seal 9-11 seals the vessel from atmosphere and also allows insertion and retrieval of the probe 8 in a pushing and pulling actions respectively.

Two probes have been fitted in the valve spindle, without a significant increase in the spindle diameter so that the flow through the valve is not adversely affected. The valve stem 26 has a bellows 30 welded to it, to create a seal to the atmosphere. Two separate holes are drilled through the valve stem 26, one for each probe. The top of the valve stem 26 has a collar 27, which holds the circumferential seal components 9, 10, and 11 in place when the disc upper part, disc lower part and the stem are assembled together. The disc upper part has a blind hole machined in it, in which the circumferential seal components 9-11 are installed. The probe sealing arrangement consists of the two O-rings 9 and 11 and the pressure sleeve 10 An O-ring seal 60 between the disc 20 upper part and the spindle collar 27 is also provided.

The temperature sensor probe is not open to the process, and a tower 7(a) for the temperature sensor probe is integral to the disc 20. The top of the tower 7(a) is 2 mm thick, which is sufficient for heat transfer.

Thus, while the probe tip 8 is exposed inside the vessel, it can be removed without need for the operator to access inside the vessel, by simply pulling the probe down after it has been released at the base as shown in FIG. 6. This action is achieved because it simply slides in contact with the two O-rings 9 and 11. While this leaves a passageway through the central stem, this is not a problem because the removal takes place only when the vessel is empty.

This system allows the probes to be removed and re-fitted while the valve is still mounted to the vessel, but only after the vessel has been drained. The infra red probe 8 is expensive and often needs to be shared between valves. It also saves time, as removing the valve 1 from the vessel requires additional manpower and equipment.

Figure 7:
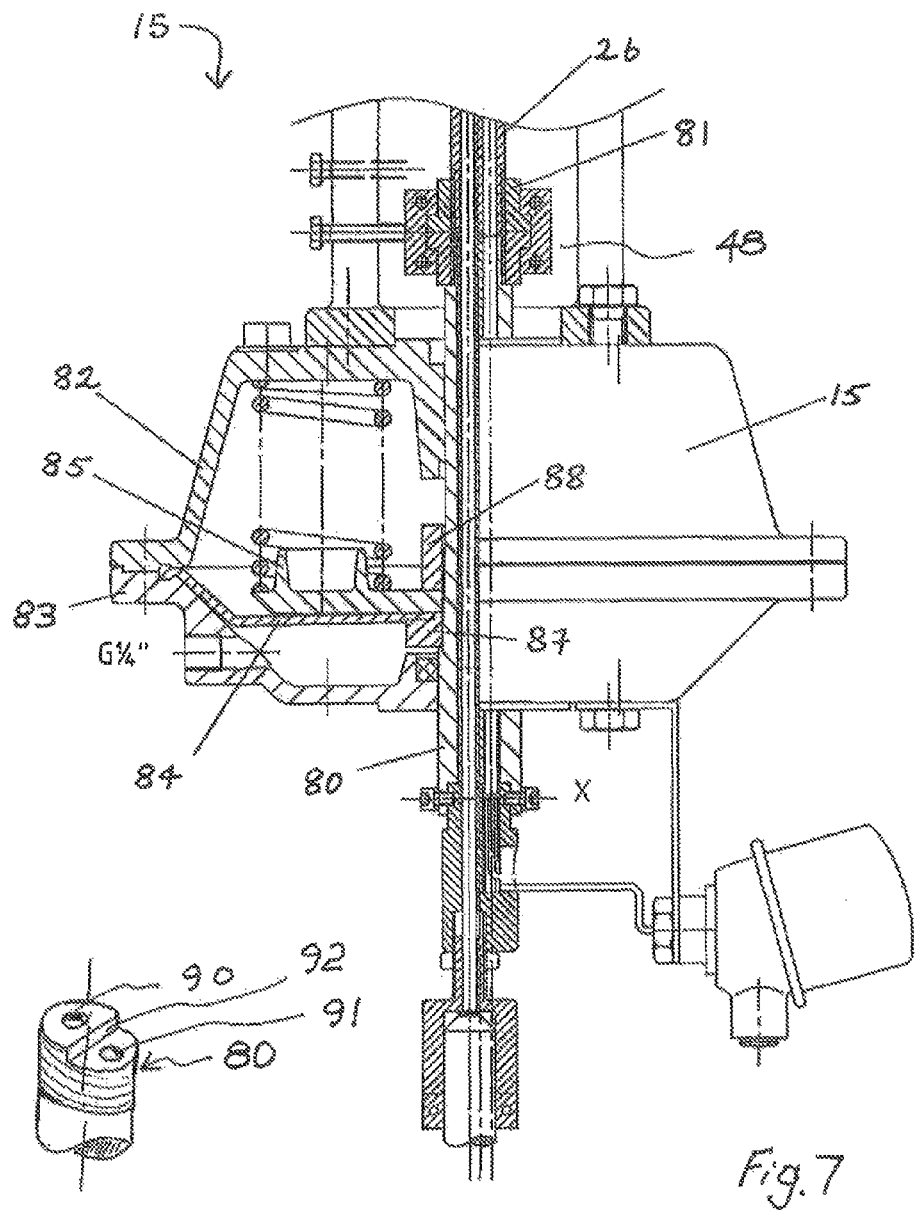
FIG. 7 shows the pneumatic actuator in greater detail.

The central stem of the system 1 consists of two separate parts, the valve stem 26 and the actuator stem 80. The actuator stem 80 has two internal bores, which are dimensionally the same as the two bores in the valve stem 26. As shown in FIG. 7 the end of the stem 80 has a step 92 between a passageway 90 and a passageway 91 corresponding to the passageways 12 and 13 respectively of the valve stem 26. The bottom end of the valve stem 26 has a corresponding step for engagement with the top of the stem 80, so that when the stems are fitted together, the passageways for the probes are aligned correctly. The steps act as an anti-rotation feature to prevent the two stems from rotating independently of each other. A threaded bush 81 is screwed onto the end of each stem, to aid assembly. When the ends of the stems are fitted together, they are clamped in place with the connecting piece 48.

The actuator stem 80 can travel in a linear movement in the pneumatic actuator assembly. The actuator comprises a housing upper part 82, a housing lower part 83, a diaphragm 84, and a spring plate 85, all of which have a centre bore through which the actuator stem 80 fits. The pressure disc 87 sits against a shoulder on the actuator stem 80, and the diaphragm 84 is fitted on top of it. The spring plate 85 is on top of the diaphragm 84 and the assembly is clamped together with a groove nut 88. The actuator spindle 80 strokes a set distance when air pressure is applied under the diaphragm. When the air is released the springs return the actuator stem 80 to its starting position.

The connection of the actuator stem 80 and valve stem 26 described above is not limited to a pneumatic actuator. The arrangement can for example also be applied to a hand actuator with a non-rising hand wheel.

The system can be used without a probe 8 in place by simply pushing a dummy probe having the same dimensions through the relevant passageways in the stems 80 and 26, and forming a seal with the circumferential seal 9-11.

Advantageous aspects of the valve system 1 are:

i) The zero-leakage sealing arrangement in the valve disc 20 for the probe tip 8 that is open to the process. The sealing arrangement prevents the vessel medium leaking down through the stem to the atmosphere and it allows the probes to be removed without disassembling the valve.

ii) The versatile coupling arrangement underneath the valve actuator, where the two probes are terminated. The coupling arrangement provides separate termination points for each of the probes. It holds the probes in place and when the coupling is removed, allows the probes to be removed quickly while the valve is still mounted on the vessel. The vessel must be drained before the probe that is open to the process is removed.

Figure 8:
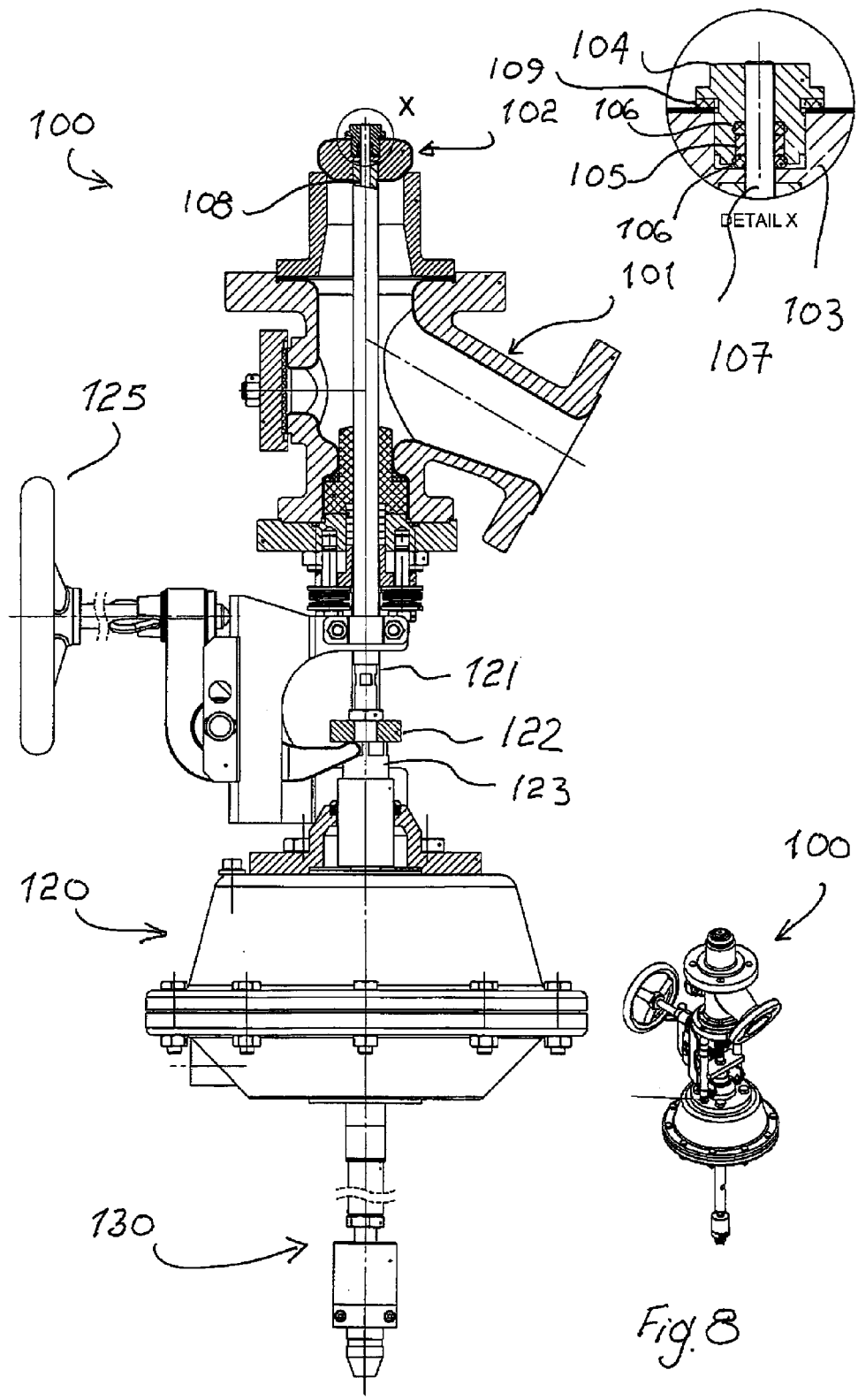
FIG. 8 shows another valve system.

It is not essential that there be two probes. An arrangement similar to that for the IR probe 8 can be provided on its own in the stem. Such an embodiment is shown in FIG. 8 in a valve system 100. This comprises a valve body 101, a plug 102 having a plug body 103 in which there is a threaded cap 104. There is a gasket seal 109 between the threaded cap 104 and the plug 103. The cap 104 has a continuation of a passageway 108 for a probe, and it contains a circumferential seal having O-rings 106 spaced apart by a pressure sleeve 105. This seal is around the passageway in a manner similar to that to the valve stem passageway in FIGS. 1 to 7. A probe 107 (or a dummy probe) extends through the passageway 108 in contact with this seal in a manner akin to that of the valve system 1 described above. Also, the valve system 100 comprises a pneumatic actuator 120, and a valve stem 121 coupled with an actuator stem 123 by a simple threaded coupler 122. The coupling between the stems in this embodiment is simpler because there is only one probe passageway. The probe 107 terminates below the actuator at a head 130. The embodiment of FIG. 8 is suitable for a lined valve because the stem and the plug can be effectively lined as an assembly, and the threaded cap (which is of tantalum material) inserted afterwards.

It will be appreciated that the invention provides a valve system with the major advantage of incorporating at least one probe. This avoids need to drill a hole in the vessel and assemble a dedicated probe system, as is the case with the prior art documents referred to above. The task of installing the valve system provides both a fully functioning valve and also at least one probe, at least one of which can be exposed to the reaction. Moreover, the probe can be very easily inserted and removed without need for disassembly of fixtures. Importantly, valve operation is not affected by the probe. The passageways for the probes are incorporated into the valve system stems, which of course are provided anyway for valve plug axial motion for opening and closing.

The invention is not limited to the embodiments described but may be varied in construction and detail. For example the embodiment with only one probe may have a passageway, a circumferential seal, and a plug arrangement similar to that of FIGS. 1 to 7, without a threaded cap in the plug.

The invention claimed is:

1. A valve system for a vessel, the valve system comprising:
    a valve body,
    a valve stem extending through the valve body and terminating in a plug for axial movement between open and closed positions as the stem moves through the valve body,
    at least one probe passageway through the valve stem and the plug, and at least one of said passageways having a circumferential seal within the plug for engaging a probe inserted in the passageway,
    wherein said circumferential seal is configured to seal around the probe in the passageway while allowing the probe to be inserted and removed by moving axially in the passageway until the probe extends from the plug so that it is exposed,
    and wherein:
        the system comprises a releasable coupler at a base of the system for removal and re-introduction of probes; and
        the system further comprises an actuator and a stem extending through the actuator and having a part of at least one of said probe passageways.

2. The valve system as claimed in claim 1, wherein the valve stem terminates in a collar engaged with the plug, and said seal is over said collar.

3. The valve system as claimed in claim 1, wherein the seal comprises at least one O-ring surrounding said passageway.

4. The valve system as claimed in claim 1, wherein the seal comprises at least one O-ring surrounding said passageway; and wherein there are at least two O-rings spaced apart by a sleeve.

5. The valve system as claimed in claim 1, wherein the valve stem terminates in a collar engaged with the plug, and said seal is over said collar; and wherein the plug comprises an O-ring seal for engagement with a vessel aperture rim.

6. The valve system as claimed in claim 1, wherein the stem comprises at least two passageways, to accommodate at least two probes.

7. The valve system as claimed in claim 1, wherein the stem comprises at least two passageways, to accommodate at least two probes; and wherein at least one passageway is blind, whereby a probe is not exposed.

8. The valve system as claimed in claim 1, wherein the stem comprises at least two passageways, to accommodate at least two probes; and wherein at least one passageway is blind, whereby a probe is not exposed; and wherein said passageway terminates in a tower in the valve plug.

9. The valve system as claimed in claim 1, wherein the stem comprises at least two passageways, to accommodate at least two probes; and wherein separation distance of the passageways is in the range of 1.5 mm to 30 mm.

10. The valve system as claimed in claim 1, wherein the releasable coupler comprises a release fastener for connecting a sleeve for a removable probe from a base of an actuator of the system.

11. The valve system as claimed in claim 1, wherein the actuator stem is connected to the valve stem with the passageway aligned.

12. The valve system as claimed in claim 1, wherein interconnecting ends of the valve and actuator stems have interengagement features arranged so that when the stems are fitted together the passageways are aligned correctly, slots acting to prevent the stems from rotating independently of each other.

13. The valve system as claimed in claim 1, wherein the actuator stem is arranged to travel in a linear movement in the actuator, and an actuator upper housing part, an actuator lower part, an actuator diaphragm, and an actuator spring plate all have passageways through which the actuator stem fits.

14. The valve system as claimed in claim 1, further comprising a probe adapted for insertion in said passageway and having a tip suitable for exposure inside a reaction vessel.

15. The valve system as claimed in claim 1, further comprising a dummy probe adapted to fit in said passageway and seal against the circumferential seal when a probe is not required.

16. A reaction vessel comprising:
    a vessel body, and
    a valve system connected in a wall of the vessel and comprising:
        a valve body,
        a valve stem extending through the valve body and terminating in a plug for axial movement between open and closed positions as the stem moves through the valve body,
        at least one probe passageway through the valve stem and the plug, and at least one of said passageways having a circumferential seal within the plug for engaging a probe inserted in the passageway,
wherein said circumferential seal is configured to seal around the probe in the passageway while allowing the probe to be inserted and removed by moving axially in the passageway until the probe extends from the plug so that it is exposed,
and wherein:
the system comprises a releasable coupler at a base of the system for removal and re-introduction of probes; and
the system further comprises an actuator and a stem extending through the actuator and having a part of at least one of said probe passageways.

17. The reaction vessel as claimed in claim 16, wherein said valve system is in a base wall of the vessel body.

18. A valve system for a vessel, the valve system comprising:
a valve body,
a valve stem extending through the valve body and terminating in a plug for axial movement between open and closed positions as the stem moves through the valve body,
at least one probe passageway through the valve stem, and
at least one of said passageways having a circumferential seal for engaging a probe inserted in the passageway
wherein said circumferential seal is configured to seal around the probe in the passageway while allowing the probe to be inserted and removed by moving axially in the passageway,
and wherein:
the stem, at least one passageway, and the seal are arranged to engage a probe so that it is exposed in the vessel;
said circumferential seal is within the plug;
the system comprises a releasable coupler at a base of the system for removal and re-introduction of probes; and
the system further comprises an actuator and a stem extending through the actuator and having a part of at least one of said probe passageways, and
wherein interconnecting ends of the valve and actuator stems have inter-engagement features arranged so that when the stems are fitted together the passageways are aligned correctly, slots acting to prevent the stems from rotating independently of each other.

19. A valve system for a vessel, the value system comprising:
a valve body,
a valve stem extending through the valve body and terminating in a plug for axial movement between open and closed positions as the stem moves through the valve body,
at least one probe passageway through the valve stem, and
at least one of said passageways having a circumferential seal for engaging a probe inserted in the passageway
wherein said circumferential seal is configured to seal around the probe in the passageway while allowing the probe to be inserted and removed by moving axially in the passageway,
and wherein:
the stem, at least one passageway, and the seal are arranged to engage a probe so that it is exposed in the vessel;
said circumferential seal is within the plug;
the system comprises a releasable coupler at a base of the system for removal and re-introduction of probes; and
the system further comprises an actuator and a stem extending through the actuator and having a part of at least one of said probe passageways, and
wherein the actuator stem is arranged to travel in a linear movement in the actuator, and an actuator upper housing part, an actuator lower part, an actuator diaphragm, and an actuator spring plate all have passageways through which the actuator stem fits.

* * * * *

UNITED STATES PATENT AND TRADEMARK OFFICE
CERTIFICATE OF CORRECTION

| | | |
|---|---|---|
| PATENT NO. | : 9,297,478 B2 | Page 1 of 1 |
| APPLICATION NO. | : 13/817904 | |
| DATED | : March 29, 2016 | |
| INVENTOR(S) | : John O'Halloran et al. | |

It is certified that error appears in the above-identified patent and that said Letters Patent is hereby corrected as shown below:

ON THE TITLE PAGE

Item 73 please correct Assignee's name from "SCHUP VALVE TECHNOLOGY GMBH" to --SCHUF VALVE TECHNOLOGY GMBH--.

Signed and Sealed this
Seventh Day of June, 2016

Michelle K. Lee
*Director of the United States Patent and Trademark Office*